United States Patent [19]
Niemann

[11] 3,958,656
[45] Mar. 25, 1976

[54] INSTALLATION FOR COMPENSATING FORCES ACTING TRANSVERSELY TO THE DRIVING DIRECTION ON A FAST MOVING VEHICLE

[75] Inventor: Klaus Niemann, Endersbach, Germany

[73] Assignee: Daimler-Benz Aktiengesellschaft, Germany

[22] Filed: Sept. 24, 1974

[21] Appl. No.: 508,833

[30] Foreign Application Priority Data
Sept. 26, 1973 Germany............................ 2348317

[52] U.S. Cl................................ 180/79.1; 180/142
[51] Int. Cl.² ......................................... B62D 5/04
[58] Field of Search ................. 180/79.2 R, 79.2 D, 180/79.1

[56] References Cited
UNITED STATES PATENTS 2,902,104  9/1959  Schilling ...................... 180/79.2 D
3,011,579  12/1961  Milliken et al................. 180/79.2 D Primary Examiner—M. H. Wood, Jr.
Assistant Examiner—John A. Pekar
Attorney, Agent, or Firm—Craig & Antonelli

[57] ABSTRACT

A system for compensating forces acting on a rapidly moving vehicle transversely to its driving direction, such as transverse acceleration forces and yaw angle forces as well as possibly roll movements, by means of torques applied to the steering wheel, in which measured magnitudes of certain degrees of freedom which are detected as second derivatives with respect to time while driving, are combined with each other by an information converter and are converted into a torque which is transmitted in bypassing relationship to the servo-steering device and which signals by its occurrence to the driver the presence of disturbing forces and causes the driver to apply counter-forces; the servo-steering device is thereby so constructed that no torque stemming from the steerable wheels is transmitted to the steering wheel.

25 Claims, 4 Drawing Figures

INSTALLATION FOR COMPENSATING FORCES ACTING TRANSVERSELY TO THE DRIVING DIRECTION ON A FAST MOVING VEHICLE

The present invention relates to an installation for the compensation of forces acting transversely to the driving direction on a fast-driving vehicle, such as transverse acceleration forces and yaw-angle forces as well as possibly rolling movements, by means of torques applied to the steering wheel.

With the auxiliary or servo-steering systems constructed heretofore, the fed-back feel moment noticeable by the driver at the steering wheel is dependent from the moments of the front axle lateral forces and of the circumferential forces about the axle spindle bolts or kingpins and is porportional thereto. A construction is also known in the art in which the steering wheel moment is produced only proportional to the steering deflection and the proportionality factor is varied with the driving velocity.

It is the aim of the present invention to keep away the moment about the axle spindle bolts or steering knuckle pins from the steering wheel and to inform the driver by other means, which act more rapidly than the feedback by way of the auxiliary force assist, of side forces, yaw angles and roll movements which have occurred, and to cause the driver to undertake a counter-steering action. More particularly, known systems do not cause the driver to undertake a counter-steering action but they involve control or regulating systems which automatically correct either completely or partly the disturbances or interferences of the straight drive. They therefore take away from the driver this activity of the correction either completely or partly and are connected in parallel to the driver within the control circuit: driver-vehicle-road. Such control systems entail disadvantages which consist in particular that in case of a correction attempt under certain circumstances the steering wheel is rotated and the deflected or turned-in direction of the wheels is maintained during straight drives. Considerable means are necessary for eliminating such shortcomings and drawbacks which render the entire matter excessively costly.

The underlying problems are solved according to the present invention in that driving-dynamic measuring magnitudes of degrees of freedom, detected during the drive as second derivatives with respect to time, are interconnected with each other by an information converter and are converted into a torque which is transmitted to the steering wheel in by-passing a servo-steering mechanism and which by its occurrence signals to the driver interference or disturbance forces and causes the driver to apply counter-forces, whereby the servo-steering means is so constructed that it does not transmit any torque emanating from the steered wheels back to the steering wheel. As a result thereof, the steering wheel moment which can be noticed or sensed by the driver, is produced proportional to magnitudes important from a driving dynamic point of view, which must be interconnected and combined with each other in a suitable manner. The difference with respect to the prior art steering systems therefore consists in that a connection or interrelation caused by the mechanism of the vehicle no longer has to be accepted for the composition of the steering wheel fed-back feel moment. Instead, a moment dependent on magnitudes determinative for disturbing lateral deviations, namely, the derivatives with respect to time of the degrees of freedom: yaw, lateral deviation, and roll of the vehicle, can be produced for the better and faster information of the driver. More particularly, as tests have shown, the driver reacts to informations with a high degree of sensitivity and speed, which are transmitted to him by a counter-moment on the steering wheel.

According to a further feature of the present invention, the torque applied to the steering wheel is formed from a component proportional to the steering wheel deflection ($\beta_L$) and from a component proportional to the transverse acceleration ($b$) as well as from a component proportional to the yaw angle acceleration ($l$) according to the equation:

$$M\beta_L = K\beta_L - p_1 \cdot b - p_2 \cdot l,$$

wherein:

$\beta_L$ = steering deflection angle at the steering wheel,
$b$ = transverse acceleration,
$l$ = yaw angle acceleration,
$M_L$ = torque at the steering wheel, and
$K$, $p_1$ and $p_2$ are proportionality factors for the conversion of the measurement values $\beta_L$, $b$ and $l$, respectively.

The second derivatives $b$ and $l$ of the degrees of freedom: transverse deviation from the intended straight course and rotation with respect thereto, which signal disturbances or interferences of the straight drive without time delay, should, in order to force the driver to undertake a counter-steering action, produce steering wheel moments, which also with a released steering wheel, effect a turning of the steering system into the course deviation direction caused by the disturbance. Whence the negative signs. In order that the steering system returns when the driver releases the steering wheel after an intended drive through the curve, the moment component $K \cdot \beta_L$ dependent on the steering wheel deflection must have a sign opposite to the two other moment components $p_1 \cdot b$ and $p_2 \cdot l$, namely, must have a positive sign. Additionally, the proportionality factors $K$, $p_1$ and $p_2$ must be so matched that this moment component predominates always over those components from the yaw angle acceleration and the transverse acceleration when these magnitudes are the result of the steering wheel deflection of the driver, i.e., when the driver intends to drive through a curve. This matching or adaptation can be realized by taking into consideration the interrelationship between steering wheel deflection and transverse acceleration respectively yaw angle acceleration at the vehicle. It is thereby additionally achieved that with a released steering wheel, the undisturbed straight drive represents a stable condition.

In practice, these goals are attained in that a measurement transmitter in the form of a conventional pick-up or transducer is arranged at the front end and at the rear end of the vehicle which produce measurement values during disturbances or interferences whose sum produces an indication or criterion for the transverse acceleration ($b$) and whose difference produces an indication or criterion for the yaw angle acceleration ($l$). The measurement values picked-up by the measurement transmitters for the transverse acceleration ($b$), the yaw angle acceleration ($l$), the velocity ($v$) of the vehicle and the steering wheel deflection ($\beta_L$) may be fed according to a further feature of the present invention by way of analog computers and multipliers to a summing device which supplies a voltage proportional to the torque to be applied to the steering wheel to a converter consisting of an electric motor or a so-called Moog valve, from which the torque is applied to the steering wheel, whereby the output voltage proportional to the steering wheel moment is adapted to be converted into a steering wheel moment in a conventional manner by the control of an auxiliary energy source. With such an installation, one multiplier each may be provided for each of the three moment components ($K(v) \cdot \beta_L$; $-p_1(v) \cdot b$ and $-p_2 \cdot v) \cdot l$). Furthermore, the transverse acceleration ($-b$) may be fed directly to the multiplier for the moment component of the transverse acceleration ($-p_1(v)b$) and the velocity ($v$) of the vehicle may be fed to this multiplier by way of an analog computer which connects the velocity and combines the same with the proportionality factor ($p_1$). On the other hand, however, the yaw angle acceleration ($-l$) may be fed directly to the multiplier for the moment component of the yaw angle acceleration ($-p_2(v) \cdot l$) and the velocity ($v$) may be fed to this multiplier by way of an analog computer which connects the velocity and combines the same with the proportionality factor ($p_2$). Furthermore, the driving velocity can be fed to the multiplier for the moment component of the steering wheel deflection ($K(v) \cdot \beta_L$) by way of an analog computer which connects and combines with each other the measuring magnitude velocity ($v$) fed thereto and the proportionality factor ($K$) whereas the steering deflection $+\beta_L$ is additionally also fed directly to the multiplier.

Finally, a dependency of the proportionality factor K from the steering deflection can be introduced by conventional means. Accordingly, the proportionality factor $K$ may be variable in dependence on the magnitude of the steering wheel deflection ($\beta_L$). This dependency is to effect in particular a decrease of the proportionality factor $K$ with an increasing steering wheel deflection beginning with a predetermined limit. As a result of this measure, a limitation of the steering moment is attained with large steering wheel deflections as may occur, for example, when parking.

In order to take into consideration also roll movements, a conventional computer circuit may be provided for the correction of the system errors occurring as a result of the roll movements with measurement transmitters fixedly mounted at the body for the determination of the real transverse acceleration resulting from the measurement signals, which computer circuit describes the roll behavior of the vehicle in an analog manner and filters the same out.

It can be proved from the dynamic tests of a rapidly moving vehicle that the moment about the axle spindle bolts or steering knuckle pins informs the driver timely and correctly concerning the progress of interferences or disturbances during straight drives only in exceptional cases. With timely rapidly changing steering deflections, phase-displacements occur between the moment about the axle spindle bolts or kingpins and the curvature of the vehicle track as well as the deflection of the front wheels. A steering wheel moment which is proportional to the moment about the axle spindle bolts or kingpins, then no longer provides the driver with any information, because it arrives too late, concerning the instantaneous radius of curvature, the frictional connection load and the position of the front wheels as he was used to from stationary curve drives. In contradistinction thereto, with the system according to the present invention, the second derivatives with respect to time of the degrees of freedom: yaw and lateral deflection of the vehicle, namely the transverse acceleration and the yaw angle acceleration as well as the steering deflection are used advantageously for the formation of the steering wheel moment. The described phase displacements which occur in the prior art steering systems are not present in the system of the present invention. Additionally, a steering wheel moment composed of the accelerations of the course deviation informs the driver concerning the progress of all disturbances or interferences of the straight drive early and correctly in that a counter-torque is applied at the steering wheel which informs the driver immediately after the occurrence of the disturbance about the same and causes him to undertake a counter-steering action. The installation according to the present invention therefore is no control system as is used in the known constructions for the elimination of the disturbances by counter-steering action, but instead an information converter which converts the information "transverse acceleration" and "yaw angle acceleration " which the driver is able to sense or perceive less readily than the readily noticeable steering wheel moment but which can be indicated earlier by the installation according to the present invention than the moment about the axle spindle bolts or steering knuckle pins, into an artificial steering wheel moment, so to speak of.

Accordingly, it is an object of the present invention to provide an installation for compensating forces acting transversely to the driving direction on a rapidly moving vehicle which avoids, by simple means, the aforementioned shortcomings and drawbacks encountered in the prior art.

Another object of the present invention resides in an installation for compensating forces acting transversely to the driving direction on a fastdriving vehicle which provides an early indication of the existence of these forces and informs the driver correctly concerning their presence.

A further object of the present invention resides in a compensating system for compensating forces acting on a rapidly moving vehicle in a direction transverse to the driving direction, in which the moments about the axle spindle bolts or steering knuckle pins are kept away from the steering wheel, yet the driver is informed more rapidly than heretofore concerning the occurrence of side forces, yaw angles and roll movements.

Still a further object of the present invention resides in a system for compensating forces acting transversely to the driving direction on a rapidly moving vehicle which causes the driver to undertake a countersteering action without depriving the driver of his function to correct these disturbances.

Still another object of the present invention resides in a compensating system of the type described above which is relatively inexpensive, yet is highly reliable in operation and appropriate for its intended purposes.

Another object of the present invention resides in a compensating system of the type described above in which the undisturbed straight drive continues as a stable condition when the steering wheel is released by the driver.

These and further objects, features, and advantages of the present invention will become more apparent from the following description when taken in connection with the accompanying drawing which shows, for purposes of illustration only, one embodiment in accordance with the present invention, and wherein.

Figure 1:
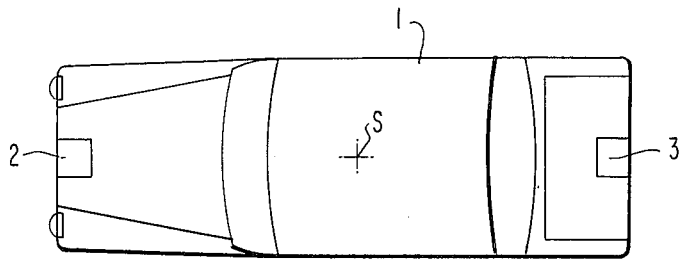
FIG. 1 is a schematic plan view on a motor vehicle with measurement transmitters installed each at a predetermined distance from the center of gravity S for detecting the transverse acceleration and the yaw angle acceleration.

Referring now to the drawing, wherein like reference numerals are used throughout the various views to designate like parts, and more particularly to FIG. 1, reference numeral 1 designates therein a conventional motor vehicle, whereby one measuring transmitter 2 and 3, for example, in the form of pick-ups or transducers of conventional construction is arranged in the front and in the rear of the vehicle 1, which indicate measurement values stemming from lateral forces in case of disturbances or interference of the straight drive. These measurement values produce, when added, the transverse acceleration ($-b$) and as difference an indication or measurement for the yaw angle acceleration ($-l$).

Figure 4:
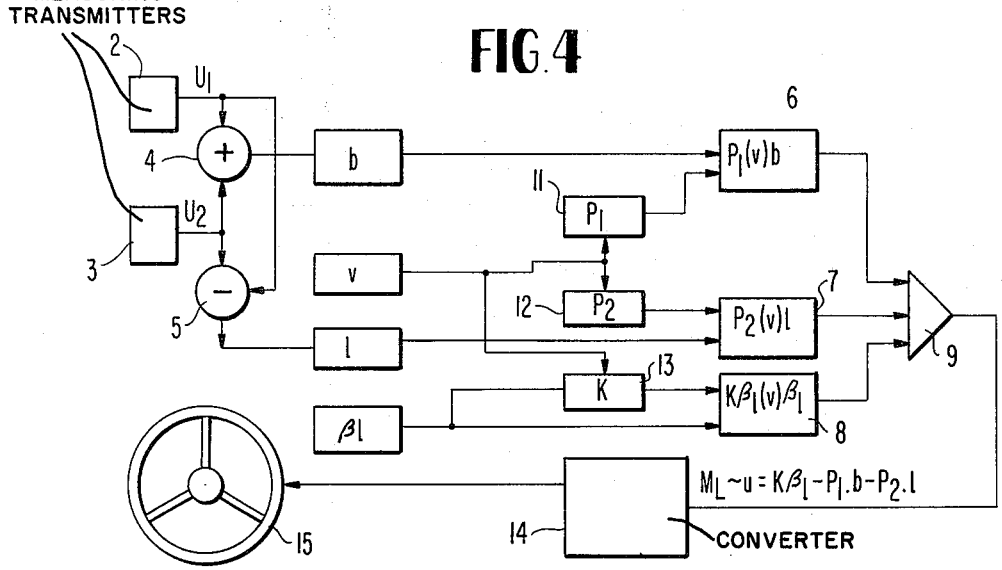
FIG. 4 is a block diagram schematically illustrating the system according to the present invention for producing a steering wheel moment from yaw angle acceleration and transverse acceleration.

FIG. 4 now illustrates how the voltages $-u_1$ and $-u_2$ are determined from the two measuring transmitters 2 and 3 in case of disturbingly occurring side forces, from which the transverse acceleration b and the yaw angle acceleration l are determined with the aid of analog summing devices 4 and 5 of conventional construction. Since the transmitters 2 and 3, as well as the summation devices 4 and 5, as also the other elements indicated in the drawing in block diagram are of conventional, known construction, involving generally conventional logic elements as known to those skilled in the art, a detailed description thereof is dispensed with herein for the sake of simplicity. The analog summing or adding device 4 thereby adds the measured voltages $u_1$ and $u_2$ whereas the analog adding device 5 produces a difference from the measured voltages $u_1$ and $u_2$. The result of the analog summing device 4 produces the transverse acceleration $-b$ whereas the result of the analog adding device 5 produces the yaw angle acceleration $-l$. Furthermore, the velocity $v$ and the steering wheel deflection $\beta_L$ are measured at the vehicle 1 by conventional means, known as such in the art. Three multipliers 6, 7 and 8 and one adding or summing device 9 are now provided in the system according to the present invention. The transverse acceleration $-b$ is now fed directly to the multiplier 6 while the velocity $v$ is fed thereto by way of an analog computer 11 of conventional type which combines or links the velocity $v$ with the proportionality factor $P_1$. The analog computer 12 operates in a similar manner which combines or links the velocity $v$ with the proportionality factor $p_2$ and feeds the result to the multiplier 7 which, as to the rest, receives directly at its input the yaw angle acceleration $-l$. Finally, the velocity $v$ is also fed to the input of the analog computer 13 and is linked or combined therein with the steering wheel deflection $\beta_L$, also fed to its input, whereupon the result appearing in the output thereof is fed to the multiplier 8 which, as to the rest, also receives directly the steering wheel deflection $\beta_L$.

The multipliers 6, 7 and 8 are connected with their outputs which produce the moment components $-p_1(v) \cdot b$, $-p_2(v) \cdot l$ and $+K\beta_L, v) \cdot \beta_L$, respectively, to the inputs of the summing or adding device 9 which combines the three moment components applied to its inputs into a voltage which corresponds to the equation according to the present invention $M_L \approx u = K\beta_L - p_1 \cdot b - p_2 \cdot l$ as torque to be applied to the steering wheel. This voltage is applied or fed to the converter 14 which as electric motor or as Moog valve applies a torque directly to the steering wheel 15 in the sense of the present invention.

Figure 3:
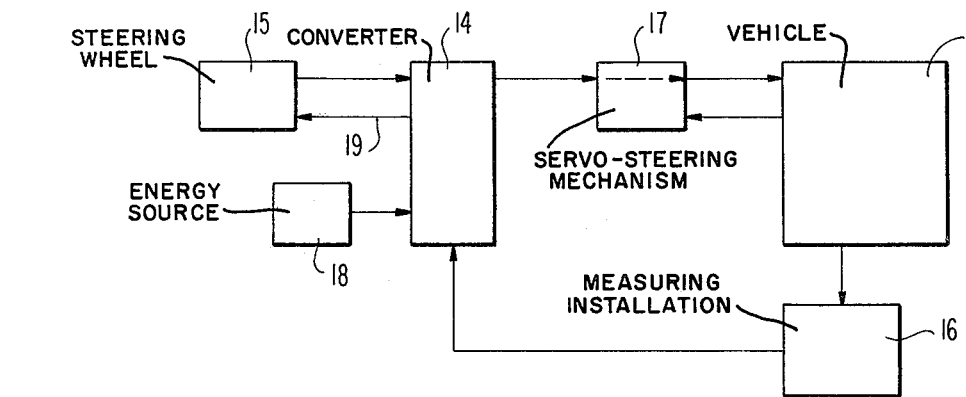
FIG. 3 is a schematic block diagram indicating the flow of information in the steering system according to the present invention.

The measurement and processing system illustrated schematically in FIG. 4 corresponds essentially to the measurement installation 16 illustrated in FIG. 3. Only the pick-ups or transducers for the transverse acceleration, for the velocity, for the yaw angle acceleration and for the steering wheel angle $\beta_L$ are mounted at the vehicle itself, and the converter 14 is also separately illustrated in FIG. 3.

Figure 2:
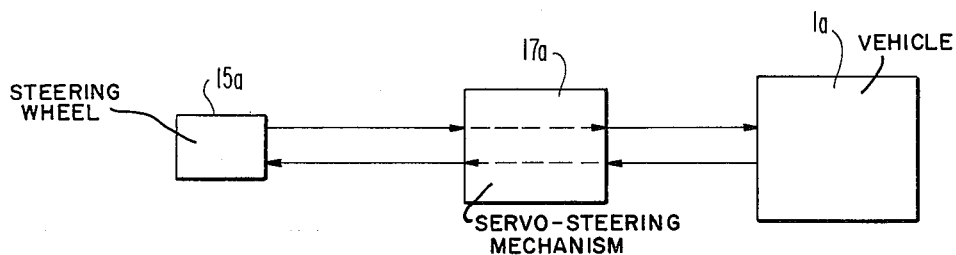
FIG. 2 is a schematic block diagram indicating the flow of information in prior art steering systems.

It follows from FIG. 3 that the steering movements of the steering wheel 15 carried out by the driver of the vehicle are transmitted directly to the steerable wheels of the vehicle 1 by way of the converter 14 and the servo-steering system 17. The moments which are fed back in the customary manner to the servo-steering system from the vehicle, i.e., from its axle spindle bolts or kingpins of the steered wheels, for example, during disturbances or interference due to side winds, are not further transmitted back from the servo-steering device 17 to the steering wheel 15 in the system according to the present invention since the servo-steering mechanism 17 according to the present invention is so constructed by conventional, known means that a feedback of disturbing moments cannot take place. More rapidly than the disturbing or interferring moments which are customarily checked back or fed back, as illustrated in FIG. 2, from the axle spindle bolts or kingpins at the vehicle 1a to the steering wheel 15a by way of the servo-steering mechanism 17a, the moments measured by the construction according to the present invention can be fed to the converter 14 by way of the measuring installation 16 in by-passing relationship to the servosteering mechanism 17 which converter is controlled by an auxiliary energy source 18. The steering wheel moment 19 is transmitted by the converter 14 to the driver by way of the steering wheel 15, which steering wheel moment 19 is opposite to his steering movement and thereby causes the driver to carry out a counter-steering movement.

In contradistinction to the hitherto known systems, the construction according to the present invention involves a steering system which does not take away any activity from the driver but in contrast to the customary steering systems, merely provides for the driver informations and feedback indications by way of the steering wheel by means of a torque which is composed of the measuring magnitudes, transverse acceleration and yaw angle acceleration. In contrast thereto, the prior art systems are control devices which correct the disturbances of the straight drive automatically either completely or partly. These prior art systems take away from the driver either completely or partly his activity or participation, however, if large expenditures are not accepted and spent, they may cause serious disadvantages during the drive if the undertaken controls are not noticed or perceived by the driver.

The flow of information illustrated in FIG. 2 for a prior art steering system shows a steering wheel 15a, a servo-steering mechanism 17a and a vehicle 1a. Steering wheel deflections are transmitted from the steering wheel 15a to the servo-steering mechanism 17a which effects the steering wheel deflection of the vehicle 1a. In case of laterally occurring disturbances or interferences, axle spindle bolt moments or kingpin moments are transmitted back by the vehicle 1a from the axle spindle bolts or kingpins to the servo-steering mechanism 17a and from the latter are indicated back as steering wheel moment to the steering wheel 15a (lower arrow in FIG. 2).

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as may be encompassed by the scope of the appended claims.

I claim:

1. An installation for compensating forces acting on a rapidly moving vehicle with steerable wheels transversely to its driving direction, by a torque applied to a steering wheel, characterized by means for detecting during the drive of the vehicle dynamic measured magnitudes of degrees of freedom as second derivatives with respect to time, information converter means receiving at its input the measured magnitudes and operable to combine with each other said magnitudes and to convert the same into a torque which is transmitted to the steering wheel in by-passing relationship to a servo-steering means and which signals to the driver by its occurrence disturbing forces and thereby causes the driver to apply counter-forces, in that the servo-steering means is so constructed that no torque originating at the steerable wheels is transmitted back to the steering wheel, in that said forces acting on the vehicle include transverse acceleration forces and yaw angle forces, in that the torque applied to the steering wheel is formed from a component proportional to the steering wheel deflection, from a component proportional to the transverse acceleration and from a component proportional to the yaw angle acceleration, in that the torque is fromed from components according to the equation $$M_L = K \cdot \beta_L - p_1 \cdot b - p_2 \cdot l$$

wherein $M_L$ is the torque applied to the steering wheel, $b$ is the transverse acceleration, $l$ is the yaw angle acceleration, $\beta_L$ is the steering deflection angle at the steering wheel, and $K$, $p_1$ and $p_2$ are proportionality factors for the conversion of the measurement values $\beta_L$, $b$ and $l$, and in that one measuring transmitter means each is arranged in the front area and in the rear area of the vehicle which produce measured values in case of disturbances whose sum is an indication for the transverse acceleration and whose difference is an indication for the yaw angle acceleration.

2. An installation according to claim 1, characterized in that said forces also include roll movements.

3. An installation according to claim 1, characterized in that the measured values produced by the transmitter means for the transverse acceleration, the yaw angle acceleration, the velocity of the vehicle, and the steering wheel angle are fed by way of analog computer means and multiplier means to a summing means which feeds a voltage proportional to the torque to be applied to the steering wheel to a converter means operable to convert electrical into mechanical energy, the torque being applied to the steering wheel from the last-mentioned converter means.

4. An installation according to claim 3, characterized in that the converter means is an electric motor.

5. An installation according to claim 3, characterized in that the converter means is a valve means.

6. An installation according to claim 3, characterized by means in said converter means for converting the output voltage proportional to the steering wheel moment into a steering wheel moment by control of an auxiliary energy source means.

7. An installation according to claim 6, characterized in that one multiplier means each is provided for each moment component.

8. An installation according to claim 7, characterized in that the transverse acceleration is directly fed to the multiplier means for the moment component of the transverse acceleration while the velocity of the vehicle is fed thereto by way of an analog computer means which operatively combines the velocity with the corresponding proportionality factor.

9. An installation according to claim 8, characterized in that the yaw angle acceleration is directly fed to the multiplier means for the moment component of the yaw angle acceleration while the velocity of the vehicle is fed thereto by way of an analog computer means which operatively combines the velocity with the corresponding proportionality factor.

10. An installation according to claim 9, characterized in that the steering wheel deflection is fed, on the one hand, directly to the multiplier means for the moment component of the steering wheel deflection and on the other is fed to the same multiplier means by way of an analog computer means which operatively combines with each other the measured magnitudes fed thereto consisting of measured velocity and steering wheel deflection and with the corresponding proportionality factor.

11. An installation according to claim 10, characterized in that the last-mentioned proportionality factor is variable as a function of the magnitude of the steering wheel deflection.

12. An installation according to claim 11, characterized in that for purposes of correcting the system error resulting from roll movements with transmitter means fixedly mounted at the body, computer circuit means are provided for determining the real transverse acceleration resulting from the measured signals, said computer circuit means being operable to describe in an analog manner, the roll behavior of the vehicle and filtering the same out.

13. An installation for compensating forces acting on a rapidly moving vehicle transversely to its driving direction, by a torque applied to a steering wheel, charterized by means for detecting during the drive of the vehicle dynamic measured magnitudes of degrees of freedom as second derivatives with respect to time, information converter means receiving at its input the measured magnitudes and operable to combine with each other said magnitudes and to convert the same into a torque which is transmitted to the steering wheel in by-passing relationship to a servo-steering means and which signals to the driver by its occurrence disturbing forces and thereby causes the driver to apply counterforces, in that said forces acting on the vehicle include transverse acceleration forces and yaw angle forces, and in that one measuring transmitter means each is arranged in the front area and in the rear area of the vehicle which produce measured values in case of disturbances whose sum is an indication for the transverse acceleration and whose difference is an indication for the yaw angle acceleration.

14. An installation according to claim 13, characterized in that the measured values produced by the transmitter means for the transverse acceleration, the yaw angle acceleration, the velocity of the vehicle, and the steering wheel angle are fed by way of analog computer means and multiplier means to a summing means which feeds a voltage proportional to the torque to be applied to the steering wheel to a converter means operable to convert electrical into mechanical energy, the torque being applied to the steering wheel from the last-mentioned converter means.

15. An installation according to claim 14, characterized in that the converter means is an electric motor.

16. An installation according to claim 14, characterized in that the converter means is a valve means.

17. An installation according to claim 14, characterized by means in said converter means for converting the output voltage proportional to the steering wheel moment into a steering wheel moment by control of an auxiliary energy source means.

18. An installation according to claim 14, characterized in that one multiplier means each is provided for each moment component.

19. An installation according to claim 14, characterized in that the transverse acceleration is directly fed to the multiplier means for the moment component of the transverse acceleration while the velocity of the vehicle is fed thereto by way of an analog computer means which operatively combines the velocity with the corresponding proportionality factor.

20. An installation according to claim 14, characterized in that the yaw angle acceleration is directly fed to the multiplier means for the moment component of the yaw angle acceleration while the velocity of the vehicle is fed thereto by way of an analog computer means which operatively combines the velocity with the corresponding proportionality factor.

21. An installation according to claim 14, characterized in that the steering wheel deflection is fed, on the one hand, directly to the multiplier means for the moment component of the steering wheel deflection and on the other is fed to the same multiplier means by way of an analog computer means which operatively combines with each other the measured magnitudes fed thereto consisting of measured velocity and steering wheel deflection and with the corresponding proportionality factor.

22. An installation according to claim 21, characterized in that the last-mentioned proportionality factor is variable as a function of the magnitude of the steering wheel deflection.

23. An installation according to claim 21, characterized in that the transverse acceleration is directly fed to the multiplier means for the moment component of the transverse acceleration while the velocity of the vehicle is fed thereto by way of an analog computer means which operatively combines the velocity with the corresponding proportionality factor.

24. An installation according to claim 23, characterized in that the yaw angle acceleration is directly fed to the multiplier means for the moment component of the yaw angle acceleration while the velocity of the vehicle is fed thereto by way of an analog computer means which operatively combines the velocity with the corresponding proportionality factor.

25. An installation according to claim 13, characterized in that for purposes of correcting the system error resulting from roll movements with transmitter means fixedly mounted at the body, computer circuit means are provided for determining the real transverse acceleration resulting from the measured signals, said computer circuit means being operable to describe in an analog manner the roll behavior of the vehicle and filtering the same out.

* * * * *

UNITED STATES PATENT OFFICE
CERTIFICATE OF CORRECTION

Patent No. 3,958,656  Dated May 25, 1976

Inventor(s) Klaus NIEMANN

It is certified that error appears in the above-identified patent and that said Letters Patent are hereby corrected as shown below:

Title page as it reads now:

[45] Mar. 25, 1976

Title page as it should read:

[45] May 25, 1976

Signed and Sealed this

Twenty-third Day of November 1976

[SEAL]

Attest:

RUTH C. MASON
*Attesting Officer*

C. MARSHALL DANN
*Commissioner of Patents and Trademarks*